(12) United States Patent
Frisby et al.

(10) Patent No.: US 10,701,421 B1
(45) Date of Patent: Jun. 30, 2020

(54) EMBEDDING MULTIPLE VIDEOS INTO A VIDEO STREAM

(71) Applicant: Vivint, Inc., Provo, UT (US)

(72) Inventors: Wes Frisby, Pleasant Grove, UT (US); Kyle Redfearn, Cedar Hills, UT (US); Craig Matsuura, Draper, UT (US)

(73) Assignee: Vivint, Inc., Provo, UT (US)

( * ) Notice: Subject to any disclaimer, the term of this patent is extended or adjusted under 35 U.S.C. 154(b) by 23 days.

(21) Appl. No.: 15/654,528

(22) Filed: Jul. 19, 2017

(51) Int. Cl.
| | |
|---|---|
| *H04N 21/00* | (2011.01) |
| *H04N 21/258* | (2011.01) |
| *H04N 21/266* | (2011.01) |
| *H04N 21/482* | (2011.01) |
| *H04N 21/63* | (2011.01) |
| *G06F 16/68* | (2019.01) |
| *G06F 16/78* | (2019.01) |
| *G06F 16/957* | (2019.01) |
| *H04N 21/81* | (2011.01) |
| *H04N 7/173* | (2011.01) |

(52) U.S. Cl.
CPC ....... *H04N 21/25891* (2013.01); *G06F 16/68* (2019.01); *G06F 16/78* (2019.01); *G06F 16/9577* (2019.01); *H04N 21/26603* (2013.01); *H04N 21/482* (2013.01); *H04N 21/4828* (2013.01); *H04N 21/632* (2013.01); *H04N 7/17318* (2013.01); *H04N 21/81* (2013.01)

(58) Field of Classification Search
CPC .......... H04N 13/04; H04N 13/00; H04N 5/93; H04N 5/45; H04N 21/431; H04N 21/44; H04N 19/597; H04N 21/4316; H04N 13/361; H04N 13/139; H04N 13/189; H04N 13/178; H04N 13/194
See application file for complete search history.

(56) References Cited

U.S. PATENT DOCUMENTS

| | | | | |
|---|---|---|---|---|
| 6,570,990 | B1* | 5/2003 | Kohn | H04N 7/1675 348/E11.002 |
| 7,339,595 | B2* | 3/2008 | Hilliard | G06F 3/14 345/589 |
| 7,970,164 | B2* | 6/2011 | Nakamura | G06T 1/0085 382/100 |
| 8,526,609 | B1* | 9/2013 | Huang | H04N 21/4305 348/263 |
| 9,080,992 | B2* | 7/2015 | Olsson | H04N 5/2252 |
| 9,185,328 | B2* | 11/2015 | Jang | H04N 5/45 |
| 9,497,349 | B2* | 11/2016 | Martin | H04N 1/32325 |
| 9,635,131 | B2* | 4/2017 | Roberts, Jr. | H04L 67/306 |
| 9,736,381 | B2* | 8/2017 | Koti | H04N 5/23293 |
| 2007/0097212 | A1 | 5/2007 | Farneman | |
| 2008/0086258 | A1 | 4/2008 | Wall | |
| 2011/0216167 | A1* | 9/2011 | Katz | H04N 13/246 348/47 |

(Continued)

FOREIGN PATENT DOCUMENTS

| | | | |
|---|---|---|---|
| KR | 1020060023418 A | | 3/2006 |
| KR | 101178886 B1 | | 9/2012 |

*Primary Examiner* — Frank F Huang
(74) *Attorney, Agent, or Firm* — Holland & Hart, LLP

(57) ABSTRACT

A method for security and/or automation systems is described. In one embodiment, the method may include streaming a first view of a camera in a video stream, embedding a second view of the camera in the video stream, and transmitting the video stream to at least one of a first display device and a second display device.

18 Claims, 7 Drawing Sheets

(56) References Cited

U.S. PATENT DOCUMENTS

| | | | |
|---|---|---|---|
| 2011/0268194 A1* | 11/2011 | Nagano | H04N 21/234363 375/240.25 |
| 2012/0327179 A1 | 12/2012 | Watson et al. | |
| 2013/0107005 A1* | 5/2013 | Lim | H04N 5/33 348/46 |
| 2017/0208315 A1* | 7/2017 | Rajak | H04N 13/161 |

* cited by examiner

EMBEDDING MULTIPLE VIDEOS INTO A VIDEO STREAM

BACKGROUND

The present disclosure, for example, relates to security and/or automation systems, and more particularly to embedding multiple videos into a video stream.

Security and automation systems are widely deployed to provide various types of communication and functional features such as monitoring, communication, notification, and/or others. These systems may be capable of supporting communication with a user through a communication connection or a system management action.

Present security and/or automation systems employ time stamps to synchronize video feeds. Implementing these systems involves additional computer resources and introduces delays in both the configuration and delivery of the timestamped video frames on the source side as well as in the processing of the timestamped video frames on the receiving side.

SUMMARY

The disclosure herein includes methods and systems for improving digital or electronic panning, tilting, zooming cameras. In some embodiments, the present systems and methods may improve access to one or more video feeds from the same security camera. In some cases, images from two different views of the same camera may be embedded in the same video stream.

A method for security and/or automation systems is described. In one embodiment, the method may include streaming a first view of a camera in a video stream, embedding a second view of the camera in the video stream, and transmitting the video stream to at least one of a first display device and a second display device.

In some cases, the first view may include a field of view without digital panning, digital tilting, or digital zooming. In some embodiments, a field of view of the second view may include a portion of the field of view of the first view. In some cases, the second view may include a field of view with at least one of digital panning, digital tilting, and digital zooming, or a combination thereof.

In some embodiments, upon receiving the video stream, the first display device or the second display device, or both, may select between the first view and the second view and display the selected view. In some cases, the second view may be synchronized across the first display device and the second display device based at least in part on embedding the second view of the camera in the video stream. In some embodiments, the video stream may be transmitted based at least in part on one or more video protocols.

In some cases, the one or more video protocols may include at least one of an H.264 protocol, a moving pictures expert group (MPEG) protocol, a motion join photographic experts (MJPEG) protocol, real time transfer protocol (RTP), real time streaming protocol (RTSP), real time control protocol (RTCP), secure real-time transport protocol (SRTP), secure real-time transport control protocol (SRTCP), web real time communications (WebRTC), hypertext transfer protocol (HTTP), secure HTTP (HTTPS), user datagram protocol (UDP), transfer control protocol (TCP), or any combination thereof. In some cases, the camera may include at least one of an optical zoom and a digital zoom. In some cases, the camera may be an electronic pan tilt zoom (ePTZ) camera.

An apparatus for security and/or automation systems is also described. In one embodiment, the apparatus may include a processor, memory in electronic communication with the processor, and instructions stored in the memory, the instructions being executable by the processor to perform the steps of streaming a first view of a camera in a video stream, embedding a second view of the camera in the video stream, and transmitting the video stream to at least one of a first display device and a second display device.

A non-transitory computer-readable medium is also described. The non-transitory computer readable medium may store computer-executable code, the code being executable by a processor to perform the steps of streaming a first view of a camera in a video stream, embedding a second view of the camera in the video stream, and transmitting the video stream to at least one of a first display device and a second display device.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
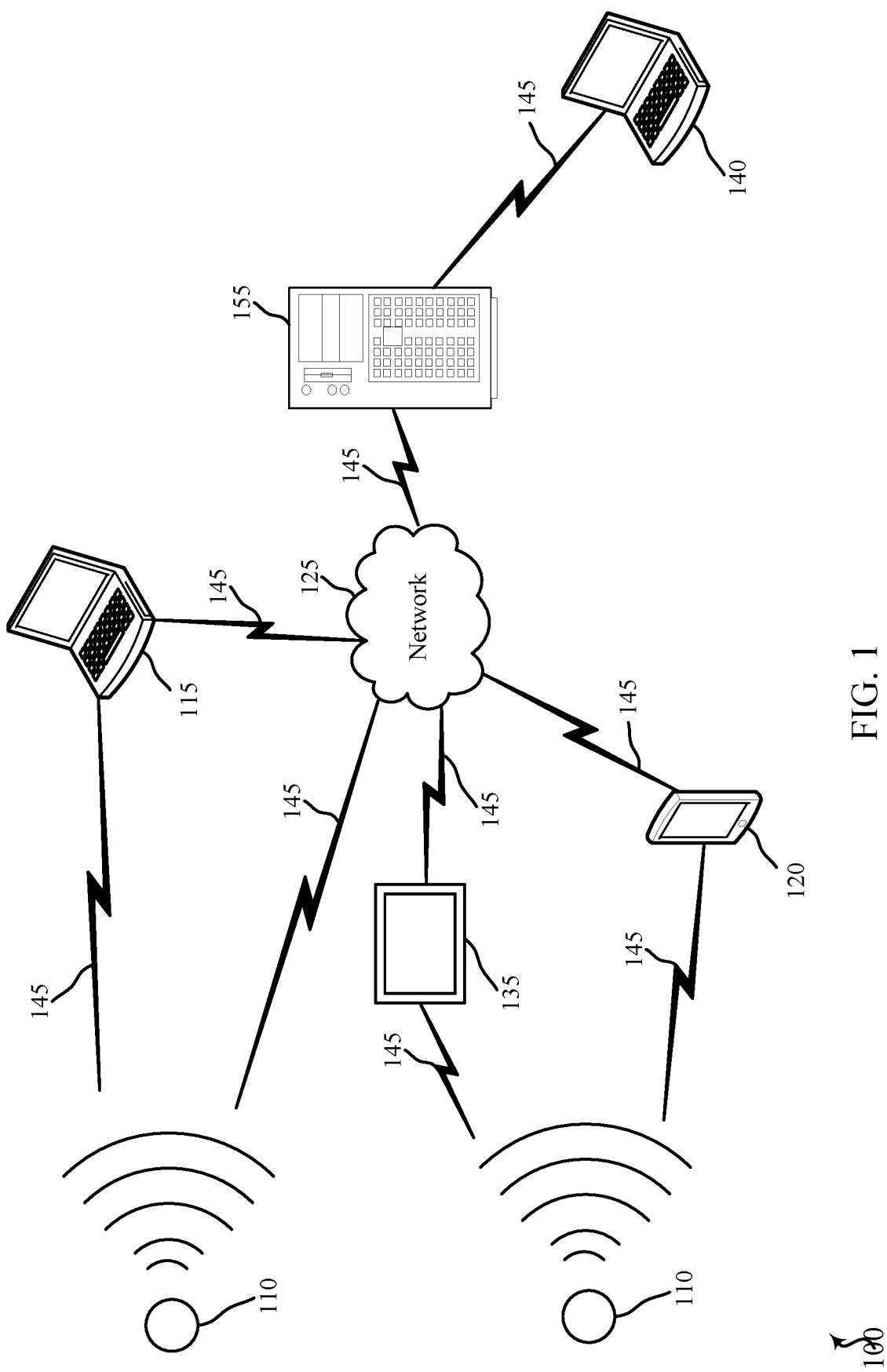
FIG. 1 is a block diagram of an example of a security and/or automation system in accordance with various embodiments.

The following relates generally to automation and/or security systems. Automation systems may include one or more sensors located inside and/or outside a premises. For example, sensors located at one or more locations of a premises may include a camera sensor, a motion sensor, a proximity sensor, and/or an audio sensor, among others. In some cases, a camera sensor of the premises may include a pan tilt zoom (PTZ) camera.

A PTZ camera includes one or more motors that enable the camera to pan, tilt, and or zoom. For example, a PTZ camera may have an alterable field of view, where the camera is configured to physically pan 360 degrees and/or physically tilt up and down. In some cases, a PTZ camera may be configured to optically zoom in and out where a motor in the PTZ camera physically moves one or more lenses. On the other hand, an electronic pan tilt zoom (ePTZ) camera may include a camera without a fixed field of view where the camera and/or a lens of the camera do not physically move. Instead, an ePTZ camera may be configured to digitally pan, tilt, and/or zoom. For example, an ePTZ camera may have a field of view that is fixed. The field of view of the ePTZ camera may include the maximum view an image sensor of the fixed ePTZ camera is able to detect.

The present systems and methods may include at least one of an ePTZ camera and a PTZ camera. In one embodiment, the field of view of the camera may be transmitted or streamed to one or more display devices. In some cases, the camera may be configured to capture a portion of the camera's field of view where the field of view has been digitally panned, digitally tilted, and/or digitally zoomed to provide a viewing area that is a portion or subsection of the camera's entire field of view. In some cases, the portion or subsection of the field of view may be referred to as a region of interest (ROI). In some cases, there are some regions in a field of view in which a user may not be interested for video monitoring. Streaming or sending these non-monitored regions, however, may needlessly occupy network bandwidth and/or storage. In some cases, a user may be interested in monitoring one or more portions of a camera's entire or unaltered field of view. For example, a camera may include a doorway in its field of view and a user may be interested in monitoring just the doorway. Accordingly, movement detected inside the ROI may be transmitted or streamed while movement outside the ROI may not be transmitted or streamed. In some cases, multiple ROIs may be designated in a single unaltered field of view.

In some embodiments, a portion or subsection of the full field of view may be transmitted or streamed to one or more display devices. In some cases, a portion of the camera's field of view may be embedded in the same video stream in which the camera's entire field of view is transmitted and/or streamed. In some embodiments, the camera may transmit captured images based at least in part on one or more video streaming protocols. As one example, the camera may transmit captured images in an H.264 stream. In some cases, one or more other streaming protocols may be used together with the H.264 stream or in place of the H.264 stream to transmit the captured images. In some cases, the present systems and methods may use a real-time transport protocol (RTP). RTP allows data transfer to multiple destinations through IP multicast. RTP may be used for audio/video transport in IP networks and may be used with an associated profile and payload format. In some cases, an RTP implementation may be transmitted based on the user datagram protocol (UDP). Other transport protocols that may be used in conjunction with RTP multimedia streams are stream control transmission protocol (SCTP) and datagram congestion control protocol (DCCP). In some cases, RTP may be used in conjunction with the real time streaming protocol (RTSP). RTSP is a network control protocol designed for use in entertainment and communications systems to control streaming media servers. The protocol is used for establishing and controlling media sessions between end points. In some cases, RTP may be used in conjunction with hypertext transfer protocol (HTTP) and/or secure HTTP (HTTPS). In some cases, an RTP session may be established for each multimedia stream. A session consists of an IP address with a pair of ports for RTP and real time control protocol (RTCP).

In some cases, embedding a portion of the camera's field of view in the video stream of the camera's entire field of view may enable one or more display devices to receive the stream, select images from the portion of the field of view or images of the entire field of view, and display the selected images. In some cases, embedding a portion of the camera's field of view in the video stream of the camera's entire field of view may enable the display devices to synchronize the display of images of the portion of the camera's field of view.

As an example, a first display device and a second display device may receive the video stream that includes both the images of the camera's entire field of view and the embedded images of the portion of the camera's entire field of view. Both the first display device and the second display device may select to view the images of the camera's entire field of view or the embedded images of the portion of the camera's entire field of view. When the first display device and the second display device each select to view the embedded images of the portion of the camera's entire field of view, the view of the images being streamed are synchronized across both devices. Accordingly, when two or more display devices receive the video stream with the images of the portion of the field of view embedded in the video stream and select to view these images, the images displayed across each display device are synchronized.

A conventional implementation may implement timestamped messages in order to ensure the images of the portion of the field of view are synchronized across multiple display devices. For example, a conventional system may synchronize frames from the camera using timestamped messages. However, using timestamped messages is more prone to errors than the present systems and methods. Also, using timestamped messages results in a more complex implementation with increased computative overhead due at least in part to the additional processing of the timestamps. Accordingly, the present systems and methods improve video streams by enabling synchronized distribution of video images of a first viewing area embedded in a stream of video images of a second viewing area different from the first viewing area.

FIG. 1 is an example of a communications system 100 in accordance with various aspects of the disclosure. In some embodiments, the communications system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate embodiments, the network 125 may be integrated with any one of the local computing device 115, 120, server 155, and/or remote computing device 140, such that separate components are not required.

Local computing device 115, 120 and remote computing device 140 may be custom computing entities configured to interact with sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an IPOD®, an IPAD®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, at least one processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some embodiments, the one or more sensor units 110 may be sensors configured to conduct periodic or ongoing automatic measurements related to audio and/or image data signals. Each sensor unit 110 may be capable of sensing multiple audio and/or image parameters, or alternatively, separate sensor units 110 may monitor separate audio and image parameters. For example, one sensor unit 110 may monitor audio (e.g., human voice frequencies, glass breaking, etc.), while another sensor unit 110 (or, in some embodiments, the same sensor unit 110) may detect images (e.g., photo, video, motion detection, infrared, etc.).

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer and/or smart phone. Where local computing device 115, 120 is a smart phone, the smart phone may have a dedicated application directed to collecting audio and/or video data and detecting events therefrom. The local computing device 115, 120 may process the data received from the one or more sensor units 110 to obtain images captured by a security camera as one example. In alternate embodiments, remote computing device 140 may process the data received from the one or more sensor units 110, via network 125 and server 155, to obtain one or more views of a security camera for example. Data transmission may occur via, for example, frequencies appropriate for a personal area network (such as BLUETOOTH® or IR communications) or local or wide area network frequencies such as radio frequencies specified by the IEEE 802.15.4 standard, among others.

In some embodiments, local computing device 115, 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of passive audio data from a sensor unit 110, a stream of active audio data from the same or a different sensor unit 110, a stream of image (e.g., photo and/or video) data from either the same or yet another sensor unit 110, and a stream of motion data from either the same or yet another sensor unit 110.

In some embodiments, server 155 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory and/or through a wired and/or a wireless connection) containing audio and/or video data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

Figure 2:
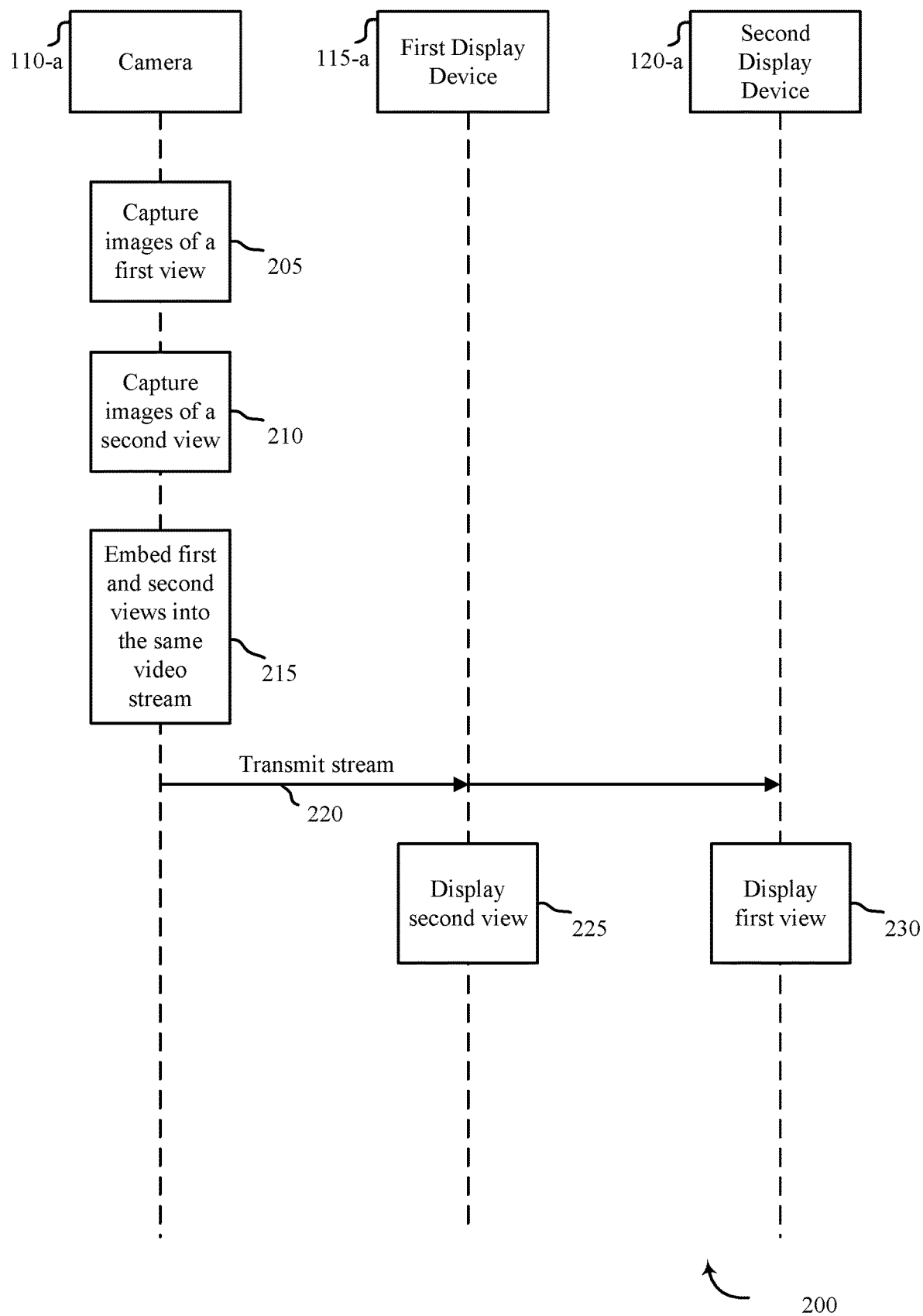
FIG. 2 is a block diagram illustrating one example of an environment 200 relating to a security and/or an automation system, in accordance with various aspects of this disclosure.

FIG. 2 shows a block diagram of a data flow 200 relating to a security and/or an automation system, in accordance with various aspects of this disclosure. The data flow 200 illustrates the flow of data between camera 110-a, first display device 115-a, and second display device 120-a. The camera 110-a may be an example of one or more aspects of sensor 110 from FIG. 1. First display device 115-a and/or second display device 120-a may examples of one or more aspects of devices 115, 120, 135, 140, or 155 of FIG. 1. In some cases, first display device 115-a and/or second display device 120-a may include a computing device such as a smart phone, desktop, laptop, remote server (e.g., server 155 of FIG. 1). In some cases, first display device 115-a and/or second display device 120-a may include a storage device and/or database.

At block 205, camera 110-a may capture images of a first view or first point of view detected by an image sensor of camera 110-a. At block 210, camera 110-a may capture images of a second view or second point of view detected by the image sensor of camera 110-a. In one embodiment, camera 110-a may be configured to perform at least one of panning, tilting, and zooming, or any combination thereof. In one embodiment, camera 110-a may be configured to perform at least one of digital or electronic panning, digital or electronic tilting, and digital or electronic zooming, or any combination thereof.

In one example, the first view may include a first point of view resulting from at least one of a panning, tilting, and zooming, or any combination thereof. Similarly, the second view may include a second point of view, different than the first point of view, resulting from at least one of a panning, tilting, and zooming, or any combination thereof. In one example, the first view may include a point of view without any panning, tilting, or zooming, while the second view may include at least one of panning, tilting, and zooming, or any combination thereof.

At block 215, camera 110-a may embed the first view and the second view into the same video stream. In one embodiment, at operation 220, camera 110-a may transmit the video stream to one or more devices. For example, camera 110-a may transmit the video stream to first display device 115-a and/or second display device 120-a. In some cases, camera 110-a may unicast, broadcast, and/or multicast the video stream to one or more display devices such as first display device 115-a and second display device 120-a. In some cases, camera 110-a may transmit the video stream to a display device based at least in part on a request received for the video stream from and made by the display device.

At block 225, first display device 115-a may display the second view embedded in the video stream. At block 230, second display device 120-a may display the first view embedded in the video stream. In one example, first display device 115-a and/or second display device 120-a may receive the video stream at the same time or at different times. Upon receiving the video stream, first display device 115-a and/or second display device 120-a may analyze the video stream, and then identify and sort through video images of the first view from the video images of the second view. In some cases, first display device 115-a and/or second display device 120-a may select images from the first view or second view and then display the selected images. As one example, both the first display device 115-a and second display device 120-a may display a view (e.g., the first view or second view, etc.) at the same time and due to the embedding of the view in the video stream the display of the view may be synchronized across the first display device 115-a and the second display device 120-a.

Figure 3:
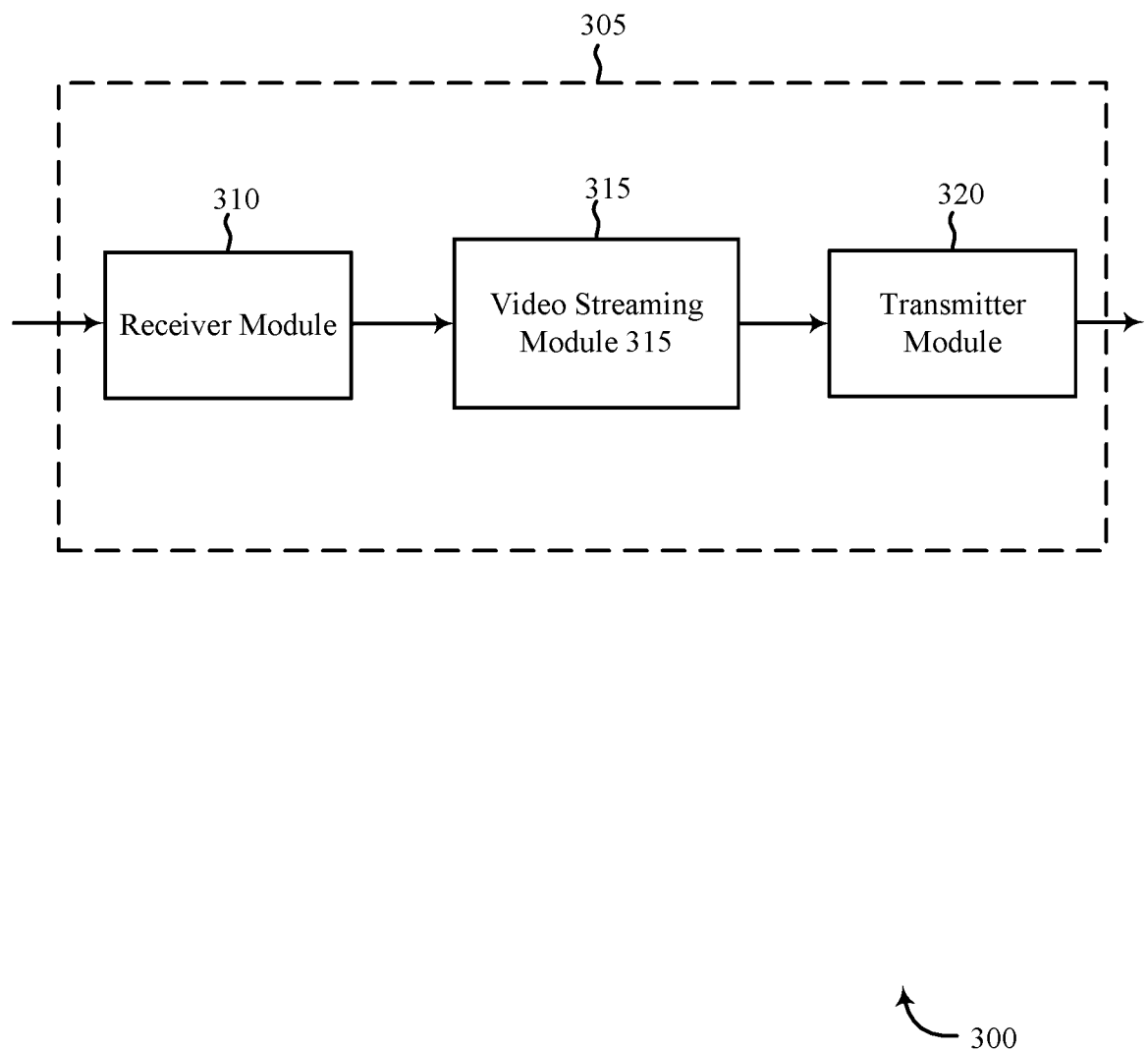
FIG. 3 shows a block diagram of a device relating to a security and/or an automation system, in accordance with various aspects of this disclosure.

FIG. 3 shows a block diagram 300 of an apparatus 305 for use in electronic communication, in accordance with various aspects of this disclosure. The apparatus 305 may be an example of one or more aspects of a control panel 135 described with reference to FIG. 1. The apparatus 305 may include a receiver module 310, video streaming module 315, and/or a transmitter module 320. The apparatus 305 may also be or include a processor. Each of these modules may be in communication with each other and/or other modules—directly and/or indirectly.

The components of the apparatus 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 310 may receive information such as packets, user data, and/or control information associated with various information channels (e.g., control channels, data channels, etc.). The receiver module 310 may be configured to receive audio signals and/or data (e.g., detected audio events) and/or image signals and/or data (e.g., detected image events, etc.). Information may be passed on to the video streaming module 315, and to other components of the apparatus 305. In some examples, video streaming module 315 may capture images of one or more simultaneous views of a security camera. For example, a first view may be a complete field of view while a second view may be a subsection of the complete field of view. For example, the second view may include at least one of an electronic zooming, panning, and tilting, or any combination thereof of the complete field of view. In some cases, video streaming module 315 may embed images of the first view and second view into the same video stream and transmit the video stream to one or more display devices.

The transmitter module 320 may transmit the one or more signals received from other components of the apparatus 305. The transmitter module 320 may transmit image signals and/or data (e.g., photo and/or video images, etc.) and/or audio signals and/or data (e.g., recorded audio events, etc.). In some cases, transmitter module 320 may transmit results of data analysis on image signals and/or data analyzed by video streaming module 315. In some examples, the transmitter module 320 may be collocated with the receiver module 310 in a transceiver module. In other examples, these elements may not be collocated.

Figure 4:
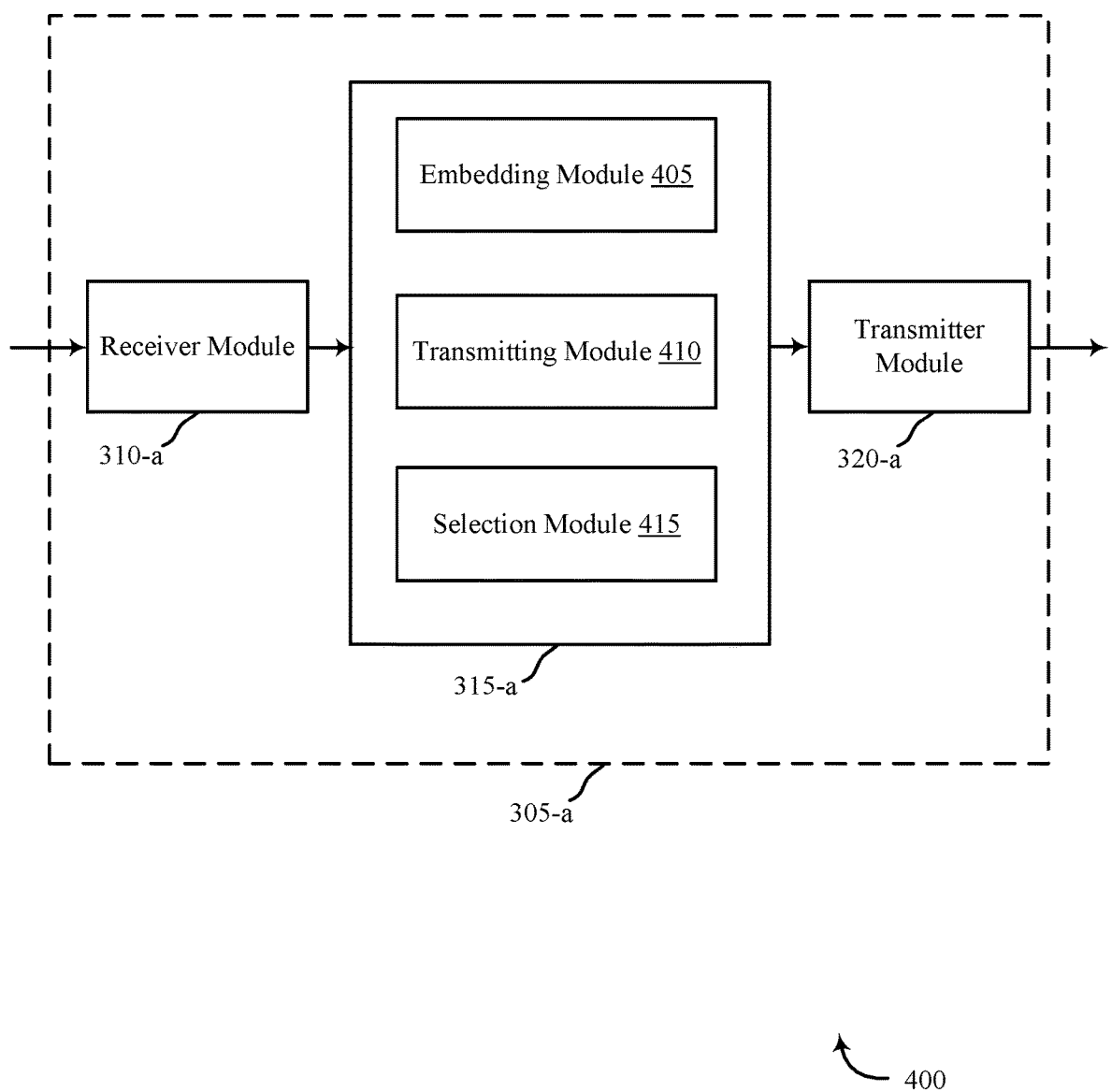
FIG. 4 shows a block diagram of a device relating to a security and/or an automation system, in accordance with various aspects of this disclosure.

FIG. 4 shows a block diagram 400 of an apparatus 305-a for use in wireless communication, in accordance with various examples. The apparatus 305-a may be an example of one or more aspects of a control panel 135 described with reference to FIG. 1. It may also be an example of an apparatus 305 described with reference to FIG. 3. The apparatus 305-a may include a receiver module 310-a, video streaming module 315-a, and/or a transmitter module 320-a, which may be examples of the corresponding modules of apparatus 305. The apparatus 305-a may also include a processor. Each of these components may be in communication with each other. The video streaming module 315-a may include embedding module 405, transmitting module 410, and selection module 415. The receiver module 310-a and the transmitter module 320-a may perform the functions of the receiver module 310 and the transmitter module 320, of FIG. 3, respectively.

In one embodiment, embedding module 405 may be configured to embed a first view of a camera in a video stream. In some embodiments, embedding module 405 may be configured to stream the first view in the video stream. In one embodiment, embedding module 405 may be configured to embed a second view of the camera in the video stream. In some embodiments, embedding module 405 may be configured to stream the second view in the video stream. In some embodiments, embedding module 405 may be configured to stream both the first view and the second view in the video stream. In some cases, the camera may include at least one of an optical zoom and a digital zoom. In some embodiments, the camera may be an electronic pan tilt zoom (ePTZ) camera.

In some embodiments, transmitting module 410 may be configured to transmit the video stream to one or more display devices. For example, transmitting module 410 may be configured to transmit the video stream to a first display device and/or a second display device.

In some cases, the first view may include a field of view of the camera without digital panning, digital tilting, or digital zooming. For example, the camera may include one or more image sensors configured to capture a field of view. In some cases, the field of view of the first view may include that part of the world that is visible and/or captured by the camera at a particular spatial position and orientation of the camera. In some cases, the camera is not able to sense objects outside the field of view of the first view when an image is sensed and/or captured by the camera. Accordingly, in some cases the field of view of the first view may be referred to as an entire field of view or the complete field of view that the camera is capable of sensing.

In some cases, a field of view of the second view may include a portion of the field of view of the first view. For instance, the field of view of the second view may include a portion or subsection of the complete field of view that the camera is capable of sensing. In some cases, the second view may include a field of view with at least one of digital panning, digital tilting, and digital zooming, or a combination thereof. For instance, the field of view of the second view may be derived by selecting a portion of the entire possible field of view of the camera.

Upon receiving the video stream, selection module 415 may select between the first view and the second view and display the selected view. In one embodiment, selection module 415 may parse the images of the first and second view from the video stream and display selected images on a display device. As an example, selection module 415 may select between the first view and the second view and display the selected view in conjunction with the first display device or the second display device, or both. For instance, selection module 415 may select the second view to display on the first display device and/or select the first view to display on the second display device. In some cases, selection module 415 may select both the first view and the second view to display on the first display device and/or the second display device.

In some cases, the second view is synchronized across a first display device and a second display device based at least in part on embedding the second view of the camera in the video stream. In some cases, the video stream may be transmitted based at least in part on one or more video protocols. As an example, the one or more video protocols may include at least one of an H.264 protocol, a moving pictures expert group (MPEG) protocol, a motion join photographic experts (MJPEG) protocol, real time transfer protocol (RTP), real time streaming protocol (RTSP), real time control protocol (RTCP), hypertext transfer protocol (HTTP), secure HTTP (HTTPS), user datagram protocol (UDP), transfer control protocol (TCP), or any combination thereof.

Figure 5:
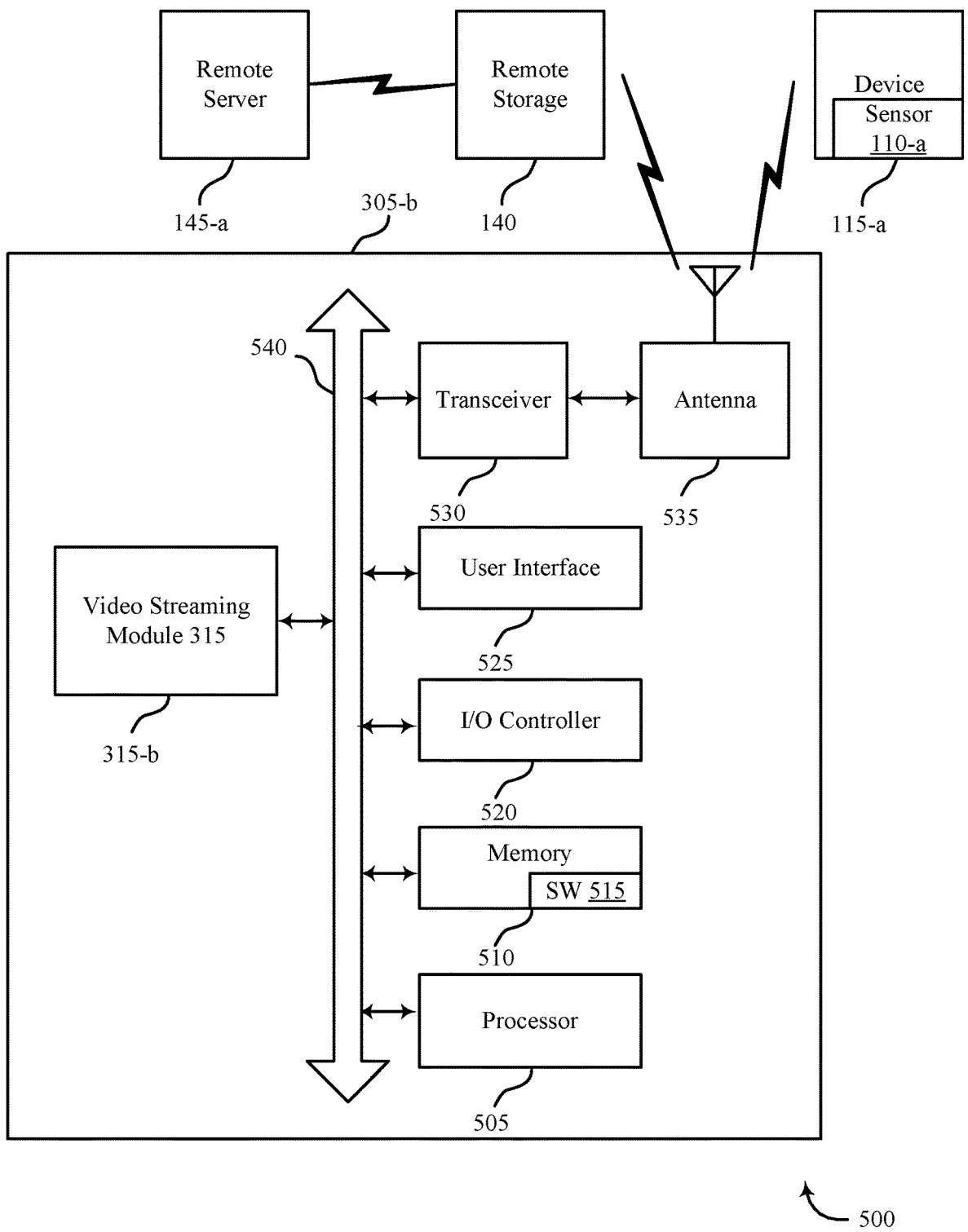
FIG. 5 shows a block diagram relating to a security and/or an automation system, in accordance with various aspects of this disclosure.

FIG. 5 shows a system 500 for use in automation systems, in accordance with various examples. System 500 may include an apparatus 305-b, which may be an example of the control panel 135 of FIG. 1. Apparatus 305-b may also be an example of one or more aspects of apparatus 305 and/or 305-a of FIGS. 3 and 4.

Apparatus 305-b may include components for bi-directional voice and data communications including components for transmitting communications and components for receiving communications. For example, apparatus 305-b may communicate bi-directionally with one or more of device 115-a, one or more sensors 110-a, remote storage 140, and/or remote server 145-a, which may be an example of the remote server of FIG. 1. This bi-directional communication may be direct (e.g., apparatus 305-b communicating directly with remote storage 140) and/or indirect (e.g., apparatus 305-b communicating indirectly with remote server 145-a through remote storage 140).

Apparatus 305-b may also include a processor module 505, and memory 510 (including software/firmware code (SW) 515), an input/output controller module 520, a user interface module 525, a transceiver module 530, and one or more antennas 535 each of which may communicate—directly or indirectly—with one another (e.g., via one or more buses 540). The transceiver module 530 may communicate bi-directionally—via the one or more antennas 535, wired links, and/or wireless links—with one or more networks or remote devices as described above. For example, the transceiver module 530 may communicate bi-directionally with one or more of device 115-a, remote storage 140, and/or remote server 145-a. The transceiver module 530 may include a modem to modulate the packets and provide the modulated packets to the one or more antennas 535 for transmission, and to demodulate packets received from the one 35, the control panel or the control device may also have multiple antennas 535 capable of concurrently transmitting or receiving multiple wired and/or wireless transmissions. In some embodiments, one element of apparatus 305-b (e.g., one or more antennas 535, transceiver module 530, etc.) may provide a direct connection to a remote server 145-a via a direct network link to the Internet via a POP (point of presence). In some embodiments, one element of apparatus 305-b (e.g., one or more antennas 535, transceiver module 530, etc.) may provide a connection using wireless techniques, including digital cellular telephone connection, Cellular Digital Packet Data (CDPD) connection, digital satellite data connection, and/or another connection.

The signals associated with system 500 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 535 and/or transceiver module 530 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 535 may receive signals or information specific and/or exclusive to itself. In other embodiments, each antenna 535 may receive signals or information not specific or exclusive to itself.

In some embodiments, one or more sensors 110-a (e.g., image, motion, proximity, smoke, light, glass break, door, audio, image, window, carbon monoxide, and/or another sensor) may connect to some element of system 500 via a network using one or more wired and/or wireless connections.

In some embodiments, the user interface module 525 may include an audio device, such as an external speaker system, an external display device such as a display screen, and/or an input device (e.g., remote control device interfaced with the user interface module 525 directly and/or through I/O controller module 520).

One or more buses 540 may allow data communication between one or more elements of apparatus 305-b (e.g., processor module 505, memory 510, I/O controller module 520, user interface module 525, etc.).

The memory 510 may include random access memory (RAM), read only memory (ROM), flash RAM, and/or other types. The memory 510 may store computer-readable, computer-executable software/firmware code 515 including instructions that, when executed, cause the processor module 505 to perform various functions described in this disclosure (e.g., capture images of multiple views of a camera and embed two or more camera views in the same video stream, etc.). Alternatively, the software/firmware code 515 may not be directly executable by the processor module 505 but may cause a computer (e.g., when compiled and executed) to perform functions described herein. Alternatively, the computer-readable, computer-executable software/firmware code 515 may not be directly executable by the processor module 505 but may be configured to cause a computer (e.g., when compiled and executed) to perform functions described herein. The processor module 505 may include an intelligent hardware device, e.g., a central processing unit (CPU), a microcontroller, an application-specific integrated circuit (ASIC), etc.

In some embodiments, the memory 510 can contain, among other things, the Basic Input-Output system (BIOS) which may control basic hardware and/or software operation such as the interaction with peripheral components or devices. For example, the video streaming module 315 to implement the present systems and methods may be stored within the system memory 510. Applications resident with system 500 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 530, one or more antennas 535, etc.).

Many other devices and/or subsystems may be connected to and/or included as one or more elements of system 500 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and are not discussed in detail in this application. Code to implement the present disclosure can be stored in a non-transitory computer-readable medium such as one or more of system memory 510 or other memory. The operating system provided on I/O controller module 520 may be iOS®, ANDROID®, MS-DOS®, MS-WINDOWS®, OS/2®, UNIX®, LINUX®, or another known operating system.

The transceiver module 530 may include a modem configured to modulate the packets and provide the modulated packets to the antennas 535 for transmission and/or to demodulate packets received from the antennas 535. While the control panel or control device (e.g., 305-b) may include a single antenna 535, the control panel or control device (e.g., 305-b) may have multiple antennas 535 capable of concurrently transmitting and/or receiving multiple wireless transmissions. The apparatus 305-b may include video streaming module 315-b, which may perform the functions described above for the video streaming module 315 of apparatus 305 of FIGS. 3 and/or 4.

Figure 6:
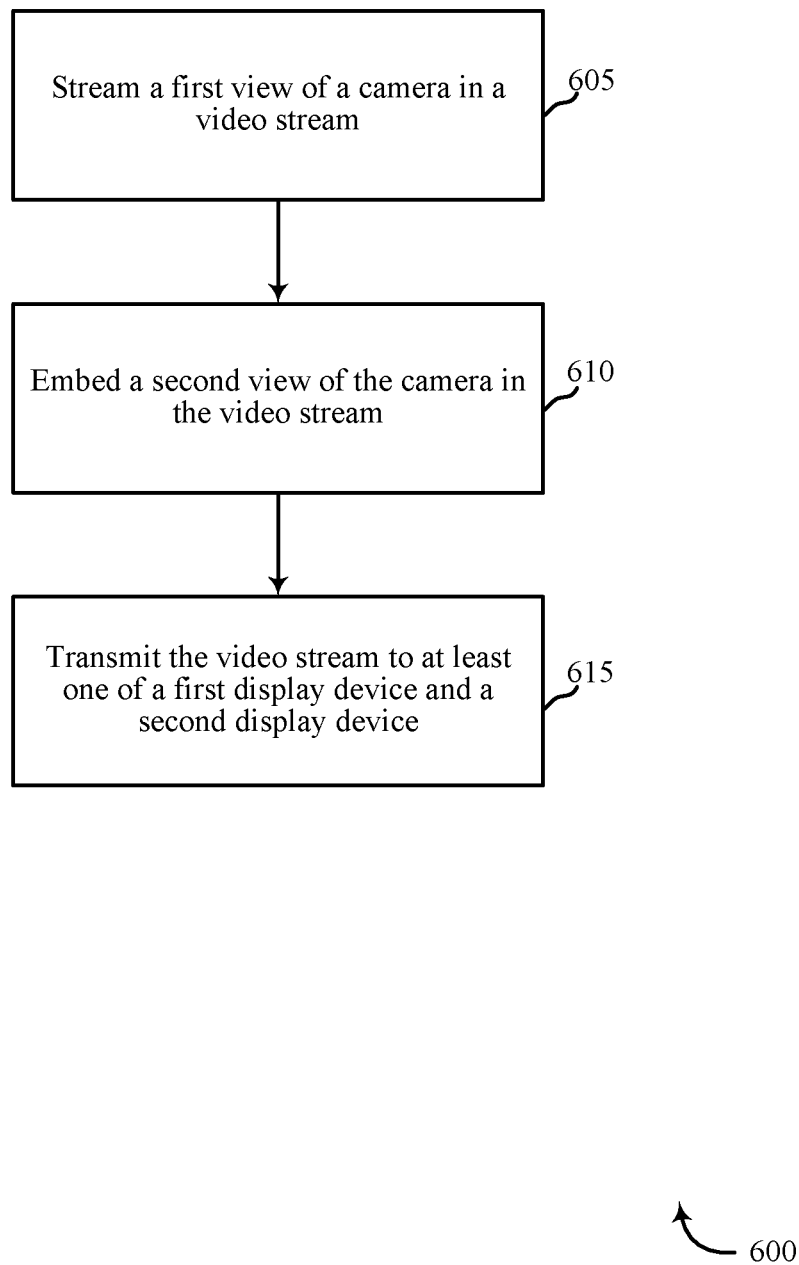
FIG. 6 is a flow chart illustrating an example of a method relating to a security and/or an automation system, in accordance with various aspects of this disclosure.

FIG. 6 is a flow chart illustrating an example of a method 600 for home automation, in accordance with various aspects of the present disclosure. For clarity, the method 600 is described below with reference to aspects of one or more of the sensor units 110 described with reference to FIGS. 1, 2, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 605, method 600 may include streaming a first view of a camera in a video stream. For example, method 600 may embed and/or stream images of an entire view of a camera in a video stream. At block 610, method 600 may include embedding a second view of the camera in the video stream. For example, method 600 may embed and/or stream images of a partial view of the same camera in the same video stream. At block 615, method 600 may include transmitting the video stream to at least one of a first display device and a second display device. For example, method 600 may transmit the video stream, in which the first view and the second view are embedded, to one or more display devices. The operation(s) at block 605-615 may be performed using the video streaming module 315 described with reference to FIGS. 3-5 and/or another module.

Thus, the method 600 may provide for embedding multiple video feeds into the same video stream relating to automation/security systems. It should be noted that the method 600 is just one implementation and that the operations of the method 600 may be rearranged, omitted, and/or otherwise modified such that other implementations are possible and contemplated.

Figure 7:
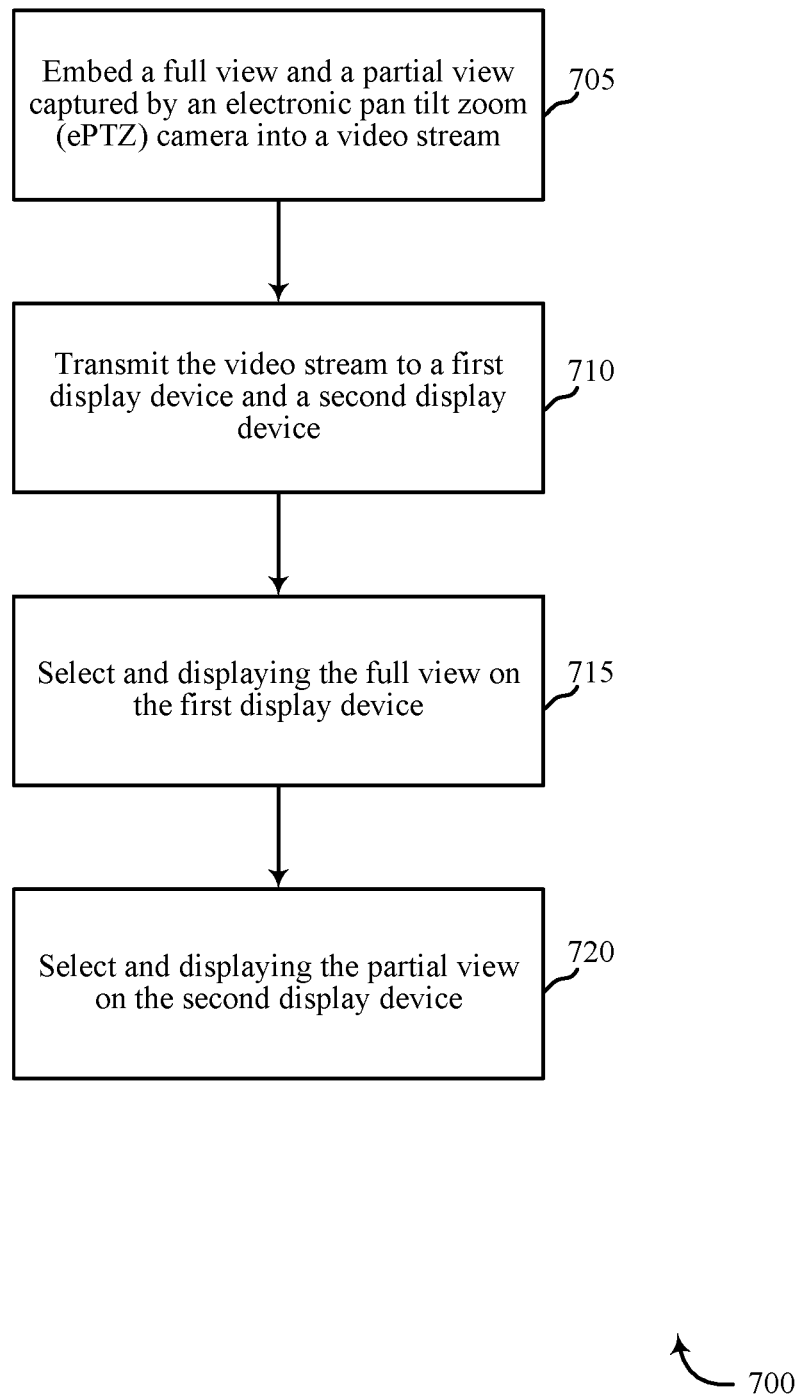
FIG. 7 is a flow chart illustrating an example of a method relating to a security and/or an automation system, in accordance with various aspects of this disclosure.

FIG. 7 is a flow chart illustrating an example of a method 700 for home automation, in accordance with various aspects of the present disclosure. For clarity, the method 700 is described below with reference to aspects of one or more of the sensor units 110 described with reference to FIGS. 1, 2, and/or 5. In some examples, a control panel, backend server, mobile computing device, and/or sensor may execute one or more sets of codes to control the functional elements of the control panel, backend server, mobile computing device, and/or sensor to perform one or more of the functions described below. Additionally or alternatively, the control panel, backend server, mobile computing device, and/or sensor may perform one or more of the functions described below using special-purpose hardware.

At block 705, method 700 may include embedding a full view and a partial view of an electronic pan tilt zoom (ePTZ) camera into a video stream. At block 710, method 700 may include transmitting the video stream to a first display device and a second display device. At block 715, method 700 may include selecting and displaying the full view on the first display device. At block 720, method 700 may include selecting and displaying the partial view on the second display device. The operations at blocks 705-720 may be performed using the video streaming module 315 described with reference to FIGS. 3-5 and/or another module.

Thus, the method 700 may provide for separating images of multiple video feeds embedded in the same video stream and displaying a selected view on a display device relating to automation/security systems. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for improving video streaming at a camera, comprising:
   capturing, using the camera, one or more images of a first view of the camera;
   capturing, using the camera, one or more images of a second view of the camera simultaneously with the one or more images of the first view of the camera, wherein the second view comprises a subsection of the first view;
   streaming the first view of the camera in a video stream;
   embedding the second view of the camera in the video stream; and
   transmitting the video stream to a first display device and a second display device, wherein the second view is synchronized across the first display device and the second display device based at least in part on embedding the second view of the camera in the video stream.

2. The method of claim 1, wherein the first view includes a field of view without digital panning, digital tilting, or digital zooming.

3. The method of claim 2, wherein a field of view of the second view includes a portion of the field of view of the first view.

4. The method of claim 1, wherein the second view includes a field of view with at least one of digital panning, digital tilting, and digital zooming, or a combination thereof.

5. The method of claim 1, wherein, upon receiving the video stream, the first display device or the second display device, or both, select between the first view and the second view and display the selected view.

6. The method of claim 1, wherein the video stream is transmitted based at least in part on one or more video protocols.

7. The method of claim 6, wherein the one or more video protocols include at least one of an H.264 protocol, a moving pictures expert group (MPEG) protocol, a motion join photographic experts (MJPEG) protocol, real time transfer protocol (RTP), real time streaming protocol (RTSP), real time control protocol (RTCP), secure real-time transport protocol (SRTP), secure real-time transport control protocol (SRTCP), web real time communications (WebRTC), hypertext transfer protocol (HTTP), secure HTTP (HTTPS), user datagram protocol (UDP), transfer control protocol (TCP), or any combination thereof.

8. The method of claim 1, wherein the camera includes at least one of an optical zoom and a digital zoom.

9. The method of claim 1, wherein the camera is an electronic pan tilt zoom (ePTZ) camera.

10. An apparatus for security and/or automation systems, comprising:
    a processor;

memory in electronic communication with the processor; and instructions stored in the memory, the instructions being executable by the processor to:

capture, using a camera, one or more images of a first view of the camera;

capture, using the camera, one or more images of a second view of the camera simultaneously with the one or more images of the first view of the camera, wherein the second view comprises a subsection of the first view;

stream the first view of the camera in a video stream;

embed the second view of the camera in the video stream; and transmit the video stream to a first display device and a second display device, wherein the second view is synchronized across the first display device and the second display device based at least in part on embedding the second view of the camera in the video stream.

11. The apparatus of claim 10, wherein the first view includes a field of view without digital panning, digital tilting, or digital zooming.

12. The apparatus of claim 11, wherein a field of view of the second view includes a portion of the field of view of the first view.

13. The apparatus of claim 10, wherein the second view includes a field of view with at least one of digital panning, digital tilting, and digital zooming, or a combination thereof.

14. The apparatus of claim 10, wherein, upon receiving the video stream, the first display device or the second display device, or both, select between the first view and the second view and display the selected view.

15. The apparatus of claim 10, wherein the video stream is transmitted based at least in part on one or more video protocols.

16. The apparatus of claim 15, wherein the one or more video protocols include at least one of an H.264 protocol, a moving pictures expert group (MPEG) protocol, a motion join photographic experts (MJPEG) protocol, real time transfer protocol (RTP), real time streaming protocol (RTSP), real time control protocol (RTCP), secure real-time transport protocol (SRTP), secure real-time transport control protocol (SRTCP), web real time communications (WebRTC), hypertext transfer protocol (HTTP), secure HTTP (HTTPS), user datagram protocol (UDP), transfer control protocol (TCP), or any combination thereof.

17. A non-transitory computer-readable medium storing computer-executable code, the code executable by a processor to:

capture, using a camera, one or more images of a first view of the camera;

capture, using the camera, one or more images of a second view of the camera simultaneously with the one or more images of the first view of the camera, wherein the second view comprises a subsection of the first view;

stream the first view of the camera in a video stream;

embed the second view of the camera in the video stream; and transmit the video stream to a first display device and a second display device, wherein the second view is synchronized across the first display device and the second display device based at least in part on embedding the second view of the camera in the video stream.

18. The non-transitory computer-readable medium of claim 17, wherein the first view includes a field of view without digital panning, digital tilting, or digital zooming.

* * * * *